(12) United States Patent
Brunner

(10) Patent No.: US 8,643,741 B2
(45) Date of Patent: Feb. 4, 2014

(54) ORIENTATION DETECTION USING IMAGE PROCESSING

(75) Inventor: Ralph Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 13/351,804

(22) Filed: Jan. 17, 2012

(65) Prior Publication Data

US 2013/0182139 A1   Jul. 18, 2013

(51) Int. Cl.
H04N 5/228 (2006.01)
H04N 5/76 (2006.01)
G06K 9/36 (2006.01)
G06K 9/00 (2006.01)

(52) U.S. Cl.
USPC ............... 348/222.1; 348/208.2; 348/231.3; 382/181; 382/182; 382/176; 382/289; 382/291; 345/158

(58) Field of Classification Search
USPC ........ 348/231.3, 231.6, 333.04, 208.2, 222.1, 348/231.2; 382/176, 286–292, 181, 182, 382/284; 345/158
See application file for complete search history.

(56) References Cited

U.S. PATENT DOCUMENTS

| | | | | |
|---|---|---|---|---|
| 5,596,657 | A * | 1/1997 | Choi | 382/227 |
| 6,009,199 | A * | 12/1999 | Ho | 382/224 |
| 6,137,905 | A * | 10/2000 | Takaoka | 382/173 |
| 7,340,110 | B2 * | 3/2008 | Lim et al. | 382/289 |
| 7,375,755 | B2 * | 5/2008 | Oya et al. | 348/333.02 |
| 7,844,135 | B2 | 11/2010 | Steinberg | |
| 2006/0204034 | A1 | 9/2006 | Steinberg et al. | |
| 2007/0098303 | A1 | 5/2007 | Gallagher et al. | |
| 2007/0229695 | A1 | 10/2007 | Kato | |
| 2008/0317378 | A1 | 12/2008 | Steinberg et al. | |
| 2009/0086050 | A1 | 4/2009 | Kasakawa | |
| 2010/0048242 | A1 | 2/2010 | Rhoads et al. | |
| 2010/0054592 | A1 | 3/2010 | Nanu et al. | |
| 2011/0064329 | A1 | 3/2011 | Steinberg et al. | |
| 2011/0249142 | A1 | 10/2011 | Brunner | |
| 2012/0162263 | A1 * | 6/2012 | Griffin et al. | 345/652 |

OTHER PUBLICATIONS

Jones, Michael, et al. "Fast Multi-view Face Detection." Mitsubishi Electric Research Laboratories: Cambridge, MA. Jul. 2003. pp. 1-10.
Sanketi, Pannag, et al., "Localizing Blurry and Low-Resolution Text in Natural Images," The Smith-Kettlewell Eye Research Institute, San Francisco, CA94115, Feb. 10, 2011.

(Continued)

*Primary Examiner* — Michael Osinski
*Assistant Examiner* — Quan Pham
(74) *Attorney, Agent, or Firm* — Wong, Cabello, Lutsch, Rutherford & Brucculeri, LLP

(57) ABSTRACT

Devices, methods, and computer readable media for performing image orientation detection using image processing techniques are described. In one implementation, an image processing method is disclosed that obtains image data from a first image captured by an image sensor (e.g., from any image capture electronic device). Positional sensor data captured by the device and corresponding to the image data may also be acquired (e.g., through an accelerometer). If the orientation of the device is not reliably discernible from the positional sensor data, the method may attempt to use rotationally invariant character detection metrics to determine the most likely orientation of the image, e.g., by using a decision forest algorithm. Face detection information may be used in conjunction with, or as a substitute for, the character detection data based on one or more priority parameters. Image orientation information may then be included within the image's metadata.

24 Claims, 9 Drawing Sheets

(56) References Cited

OTHER PUBLICATIONS

Criminisi, A., et al., "Decision Forests for Classification, Regression, Density Estimation, Manifold Learning and Semi-Supervised Learning," Microsoft Research technical report TTR-2011-114, Oct. 28, 2011.

International Search Report received in PCT Application No. PCT/US2013/051326, dated Sep. 16, 2013.

Ivana Cingovska, et al.: "Automatic Image Orientation Detection With Prior Hierarchical Content-Based Classification," Image Processing (ICIP), 2011 18th IEEE International Conference ON, IEEE, Sep. 11, 2011, pp. 2985-2988, XP032080295, DOI: 10.1109/ICIP.2011.6116289, ISBN: 987-1-4577-1304-0.

Lei Wang, et al.: "Image Orientation Detection With Integrated Human Perception Cues (Or Which Way Is Up)," Proceedings 2003 International Conference on Image Processing (Cat. No. 03CH37429), Barcelona, Spain, Sep. 14-17, 2003; IEEE, IEEE Piscataway, NJ, USA, vol. 2, Sep. 14, 2003, pp. 539-542, XP010669736, ISBN: 978-0-7803-7750-9.

\* cited by examiner

ORIENTATION DETECTION USING IMAGE PROCESSING

BACKGROUND

This disclosure relates generally to the field of image processing. More particularly, but not by way of limitation, it relates to techniques for determining an orientation of an image via the use of image processing techniques, such as face detection and optical character detection (OCD).

In recent years, the proliferation of digital cameras has been rapid, both as stand-alone devices and as part of other consumer products such as, for example, mobile phones and personal digital assistants (PDAs). Many digital cameras are fully or semi-automatic, in the sense that the camera's focus and/or exposure parameters are set automatically (i.e., without direct user input). In addition to setting the focus and/or exposure parameters, some cameras may also automatically determine and store orientation data for the image. In some embodiments, orientation data may be stored in the image's metadata. By storing an image's orientation in metadata, viewing applications and other "offline," i.e., not executing on the image capture device itself, photo editing tools may be able to automatically display the image to the user in the orientation that the image was captured in.

As used herein, an image's orientation may be determined in relation to the plane of the image capturing device's camera sensor array (i.e., image sensor) with respect to the gravity vector, g. Referring to FIG. 1, "Portrait Up" may be defined as that device orientation 100a in which the side of the device spanning the upper left corner of the device (UL) and the upper right corner of the device (UR), i.e., the "UL-UR side," is above the side of the device spanning the lower left corner of the device (LL) and the lower right corner of the device (LR), i.e., the "LL-LR side," in relation to gravity vector 102. Similarly, "Portrait Down" may be defined as that device orientation 100b in which the side of the device spanning the lower right corner of the device (LR) and the lower left corner of the device (LL), i.e., the "LR-LL side," is above the side of the device spanning the upper right corner of the device (UR) and the upper left corner of the device (UL), i.e., the "UR-UL side," in relation to gravity vector 102. Likewise, "Landscape Left" may be defined as that device orientation 100c in which the "UR-LR side" is above the "UL-LL side," and "Landscape Right" may be defined as that device orientation 100d in which the "LL-UL side" is above the "LR-UR side." For device positions in between the four absolute device orientation positions depicted in FIG. 1 (i.e., "Portrait Up," "Portrait Down," "Landscape Left," and "Landscape Right"), the image processing algorithms may choose the "most-likely intended orientation" using the detailed positional sensor data returned by the device's positional sensors, E.g., if the device is tilted less than 45 degrees to the left or right from the "Portrait Up" position, the image processing algorithm may determine that "Portrait Up" is still the most likely image orientation.

Device positional sensors may comprise an accelerometer, e.g., a microelectromechanical systems (MEMS) accelerometer, such as an ultra compact low-power three-axes linear accelerometer. An accelerometer may include a sensing element and an integrated circuit (IC) interface able to provide the measured acceleration of the device through a serial interface. Acceleration measurements reported by the accelerometer may take the form of electrical measurements indicative of the relative pull of gravity on the device along its three primary axes.

Turning now to FIG. 2, various primary axes 104 of an electronic image capture device 100e in relation to a gravity vector 102 are shown. As shown in FIG. 2, the x-axis pierces the longer edge of the display screen, with positive x values to the right side (as shown in FIG. 2) and negative values to the left side. Likewise, the y-axis pierces the shorter edge of the display screen, with positive y values to the top side (as shown in FIG. 2) and negative values to the bottom side. As is displayed more clearly in the context of the side view of image capture device 100f in FIG. 2, the z-axis pierces through the display screen of the device, with positive z values to the side of the device having the display and negative values to the back side of the device.

As oriented in FIG. 2, i.e., in the "Portrait Up" orientation, an exemplary accelerometer may return positional data indicating that 100% of the force of gravity is acting in the negative y-axis direction of image capture device 100. Likewise, if the image capture device were instead in the "Portrait Down" orientation, the exemplary accelerometer may return positional data indicating that 100% of the force of gravity is acting in the positive y-axis direction. No matter which direction the image capture device is oriented, the direction of gravitational pull remains towards the center of the Earth.

In some scenarios, device positional sensor information may prove unreliable in determining the orientation of the device with respect to a captured image. Consider the scenario where the image capture device is lying flat on a table top or other horizontal surface. As can be seen from FIG. 2, the force of gravity would be pulling exclusively in the direction of the z-axis if the image capture device were lying on a flat horizontal surface. Thus, if a user rotated the phone while it was lying on the flat horizontal surface, image processing routines would be unable to discern whether the image was being held in portrait or landscape orientation via the accelerometer information. This is because the pull of gravity along the x- and y-axes would remain negligible so long as the device was lying flat, no matter how the device was rotated.

Turning now to FIG. 3, an exemplary scenario is shown wherein image orientation may not be reliably determined by the positional sensors of an electronic capture device 100g. In FIG. 3, the image capture device 100g is being held nearly parallel to a sheet of paper 306 with written text 308 on it that is lying on a flat surface. In other words, the gravity vector 102, g, is acting almost entirely in the negative z-axis direction. Thus, rotation 310 of the image capture device around its z-axis will not be perceived by the device's accelerometer as a change in orientation for the reasons discussed above. Dashed line 300 represents the normal plane to the gravity vector, g, and angle 304 is indicative of the angular offset of the image capture device from plane 300, i.e., the level position. In some embodiments, if angle 304 is determined to be within plus or minus, say, 15 degrees from plane 300, the image capture device is deemed to be positioned in a scenario wherein the positional information data is unreliable for determining device orientation. When the device is positioned greater than 15 degrees above or below plane 300, enough of the gravity vector, g, is acting along the device's x- and y-axes that a reliable determination of image orientation may be determined from the device's positional sensor data. As mentioned above, in some exemplary scenarios having unreliable position sensor data, there may be text 308 that is captured by the device's camera sensor array and displayed on the device's display in the form of text 312. It would be helpful if a determination of image orientation in such unreliable position sensor scenarios could be made using image processing techniques, e.g., technique involving OCD metrics.

Accordingly, there is a need for techniques to improve image orientation detection in scenarios in which device positional sensor information proves unreliable. By employing image processing techniques to image orientation detection, more effective image orientation determinations may be made in scenarios during which the image capturing device is in a position where an orientation cannot reliably be determined from positional sensor information returned from the device. By using novel, rotationally invariant character detection techniques, optionally combined with face detection techniques, a robust image orientation determination system may be employed, even in situations where reliably determining image orientation was previously thought to be impossible.

SUMMARY

The image orientation detection techniques disclosed herein are designed to handle the processing of images captured by handheld personal electronic devices oriented in a wide range of positions. More specifically, the techniques described herein provide for intelligent image orientation determination using image processing techniques such as face detection and optical character detection (OCD) in scenarios where image positional sensor data is unreliable for determining the device's orientation. Once image orientation has been determined, the appropriate image orientation metadata may be stored with the image.

As disclosed herein, positional sensor data is used initially to attempt to identify the camera device's orientation. Positional sensor data may come from any device(s) capable of measuring a moment of inertia such as, for example, accelerometers and gyrometers. If the device's orientation may not be reliably discerned from the positional sensor data corresponding to a particular captured image, face detection may be performed over the image for each of the four possible device orientations ("Portrait Up," "Portrait Down," "Landscape Left," and "Landscape Right"), and a determination may be made as to which orientation produced the greatest number of faces and/or the most features most likely to be faces. The result of the face detection operations may be used to automatically determine the orientation of the image.

If face detection data is unavailable or inconclusive, further image processing techniques, such as OCD, may be utilized to aid in the determination of the device's orientation. Once image features, also referred to herein as "blobs," are located in the image, e.g., according to known image processing techniques, various metrics may be used to score the blobs and identify them as either "text" or "non-text." Once the "text" blobs have been identified, further metrics may be used to determine whether the particular text is upright or not for a given assumed orientation. In some embodiments, at least one of the metrics will be rotationally invariant. Each "text" blob may be analyzed for "uprightness" in each of the four possible device orientation directions, and a single most likely orientation direction may be recorded. The orientation direction having the largest number of upright text blobs may then be deemed to be the "correct" orientation for the image. In other embodiments, the determination of "text-ness" as well as orientation may be made in a single pass of a classification algorithm, e.g., a decision forest algorithm, over the image data.

If the face detection data and OCD data are both available for a particular image, and the orientation determinations made by the two processing analyses are inconsistent with each other, one embodiment of an image orientation detection scheme may favor either the orientation determination made based on the face detection or the orientation determination made by OCD data according to a set of predetermined priority parameters. In other words, the determination of the image processing analysis having the higher priority would be the orientation determination selected and stored in the image metadata. On the other hand, if the two types of image processing analyses are inconsistent with each other, another embodiment of an age orientation detection scheme may simply deem the image's true orientation to be inconclusive and not store any image orientation metadata with that particular image.

Thus, in one embodiment described herein, an image processing method is disclosed comprising: obtaining image data from a first image captured by an image sensor of a device; detecting a face or text in the first image by analyzing the image data; determining one or more statistics for the detected face or text, wherein at least one of the one or more determined statistics is rotationally invariant; determining an orientation of the first image based on the determined one or more statistics; and storing the orientation of the first image as metadata with the first image.

In another embodiment described herein, an electronic device is disclosed comprising: memory; an image sensor communicatively coupled to the memory; a positional sensor; a display communicatively coupled to the memory; and a programmable control device communicatively coupled to the memory and the positional sensor, wherein the memory includes instructions for causing the programmable control device to: obtain image data from a first image captured by the image sensor; detect text in the first image by analyzing the image data; determine one or more statistics for the detected text, wherein at least one of the one or more determined statistics is rotationally invariant; determine an orientation of the first image based on the determined one or more statistics, and store the orientation of the first image as metadata with the first image in the memory.

In yet another embodiment described herein, an image processing method is disclosed comprising: obtaining image data from a first image captured by an image sensor of a device; detecting text in the first image by analyzing the image data; determining one or more statistics for the detected text; determining an orientation of the first image based on the determined one or more statistics; and storing the orientation of the first image as metadata with the first image in a memory.

Novel and improved image processing techniques for image orientation detection, e.g., used on handheld personal electronic image capture devices having positional information sensors, in accordance with the various embodiments described herein may be implemented directly by a device's hardware and/or software, thus making these robust image orientation detection techniques readily applicable to any number of electronic devices with appropriate positional sensors and image processing capabilities, such as mobile phones, personal data assistants (PDAs), portable music players, digital cameras, as well as laptop and tablet computer systems.

DETAILED DESCRIPTION

Devices, methods, and computer readable media for performing image orientation detection using image processing techniques are described. In one implementation, an image processing method is disclosed that obtains image data from a first image captured by an image sensor (e.g., from any image capture electronic device). Positional sensor data captured by the device and corresponding to the image data may also be acquired (e.g., through an accelerometer). If the orientation of the device is not reliably discernible from the positional sensor data, the method may attempt to use rotationally invariant character detection metrics to determine the most likely orientation of the image, e.g., by using a decision forest algorithm. Face detection information may be used in conjunction with, or as a substitute for, the character detection data based on one or more priority parameters. Image orientation information may then be included within the image's metadata.

The techniques disclosed herein are applicable to any number of electronic devices with optical sensors and/or positional sensors, such as digital cameras, digital video cameras, mobile phones, personal data assistants (PDAs), portable music players, as well as laptop and tablet computer systems.

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be further appreciated that such development effort might be complex and time-consuming, but would nevertheless be a routine undertaking for those of ordinary skill having the benefit of this disclosure.

In the following description, for purposes of explanation, numerous specific details are set forth in order to provide a thorough understanding of the inventive concept. As part of the description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 4:
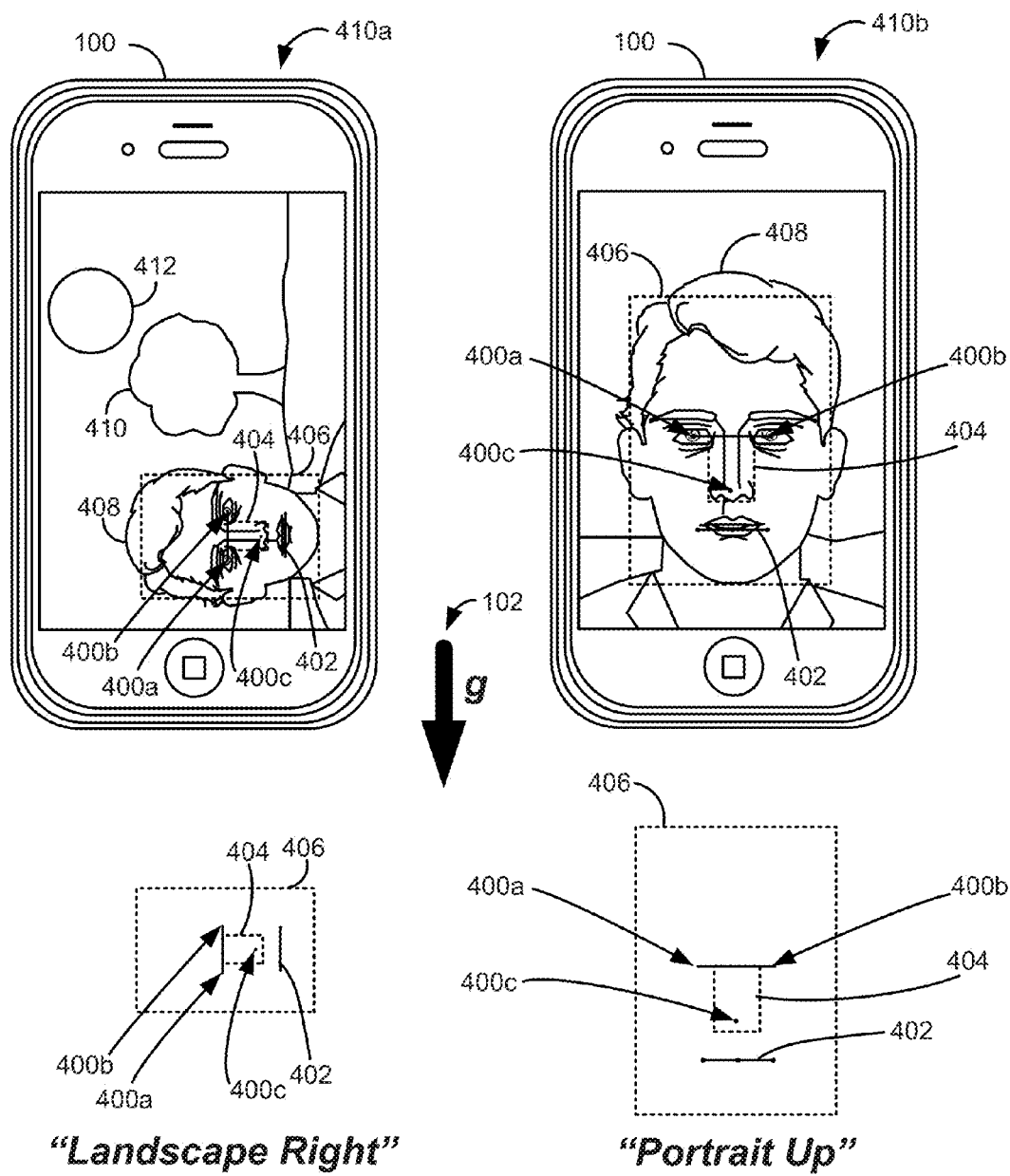
FIG. 4 illustrates image orientation detection based on face detection data, in accordance with one embodiment.

Referring now to FIG. 4, image orientation detection based on face detection data is shown, in accordance with one embodiment. In one embodiment, a face detection algorithm may run successive face detection cascades four times—one time for each of the four possible device orientation directions. Once a first orientation is selected, a face detection algorithm may be performed to determine if a face can be found for that orientation. If no face is detected, a further check is made to determine if all desired or specified device orientations have been analyzed (e.g., Portrait Up, Landscape Left, Landscape Right, and Portrait Down). If at least one of these orientations has not yet been analyzed, a next orientation is selected and analyzed to see if a face may be detected in that direction. The direction in which the strongest evidence of a face or faces is detected may then be set as the assumed image orientation. Alternately, a face detection decision forest algorithm may be run over the entire image, and the device orientation direction corresponding to the "leaf" of the resulting output decision forest having the highest "face score" may then be set as the assumed image orientation. An exemplary decision forest algorithm may classify an image area into one of five classes: not-a-face, upright face, rotated left face, rotated right face, and upside-down face. In some embodiments, an assumption may be made that the size of a detected face is never more than one-fourth of the height of the image frame and never less than one-fortieth of the height of the image frame. Placing these upper and lower bounds upon the face determination may help to eliminate some false positive face detections and speed up the face detection process overall.

Exemplary scenario 410a shows a camera device 100 that apparently captured an image while in the "Landscape Right" orientation. A human subject 408 having a face appears in the image, along with other non-human face objects tree 410 and Sun 412. Dashed line box 406 represents an exemplary bounding box for a face located by an exemplary facial detection algorithm. As is shown in scenario 410a, the face detection algorithm may also locate eye points 400a and 400b, nose point 400c, as well as mouth points 402, and a bounding box 404 having a width determined in part by the distance between the eye points and a height determined in part by the distance between the eye points and the nose point. In scenario 410a, it so happens that, from the perspective of the device held in "Portrait Up" orientation (as is shown in scenario 410a in FIG. 4), the eyes in the located face 406 are to the left of the nose, which is to the left of the mouth. Such an organization implies that the image was originally taken in "Landscape Right" orientation since it is safe to assume the faces will appear upright in a majority of images.

Exemplary scenario 410b shows a camera device 100 that apparently captured an image while in the "Portrait Up" orientation. The face of human subject 408 appears upright and roughly centered in the image. Dashed line box 406 represents an exemplary bounding box for a face located by an exemplary facial detection algorithm. As is shown in scenario 410b, the face detection algorithm may also locate eye points 400a and 400b, nose point 400c, as well as mouth points 402, and a bounding box 404 having a width determined in part by the distance between the eye points and a height determined in part by the distance between the eye points and the nose point. In scenario 410*b*, it so happens that, from the perspective of the device held in "Portrait Up" orientation (as is shown in scenario 410*b* in FIG. 5), the eyes in the located face 406 are above the nose, which is above the mouth. Such an organization implies that the image was taken in "Portrait Up" orientation.

If a face or faces are detected in a given selected orientation, the selected orientation may then be stored in the image metadata. This image orientation determination operates on the assumption that faces in images are usually oriented upright, with the tops of the faces along the top edge of the image, the bottoms of the faces along the bottom edge of the image, and so forth. Of course, this assumption is not always the case, and often multiple conflicting faces or zero faces may be found in an image, thus, face detection information may be suggestive—but not determinative—of image orientation in some cases and inconclusive in other cases.

The processing power and time required to analyze face detection algorithms in a number of different orientations can be significant. In general, the processing power of digital camera devices is limited, and the time required to perform the processing outlined above can negatively affect the quality of a user's experience of the camera. Further, in scenarios where device positional sensor information is unreliably indicative of the captured image's orientation (e.g., taking a picture of a check lying on a flat surface, business cards, menus, handwriting on a piece of paper on a desk, etc.), there may often not be any human faces located in the image, and thus face detection and positional sensor data may both be unable to aid in the image orientation determination. Accordingly, there is a need for complimentary and additional techniques to determine image orientation when device positional sensor information is unreliable.

Figure 5A:
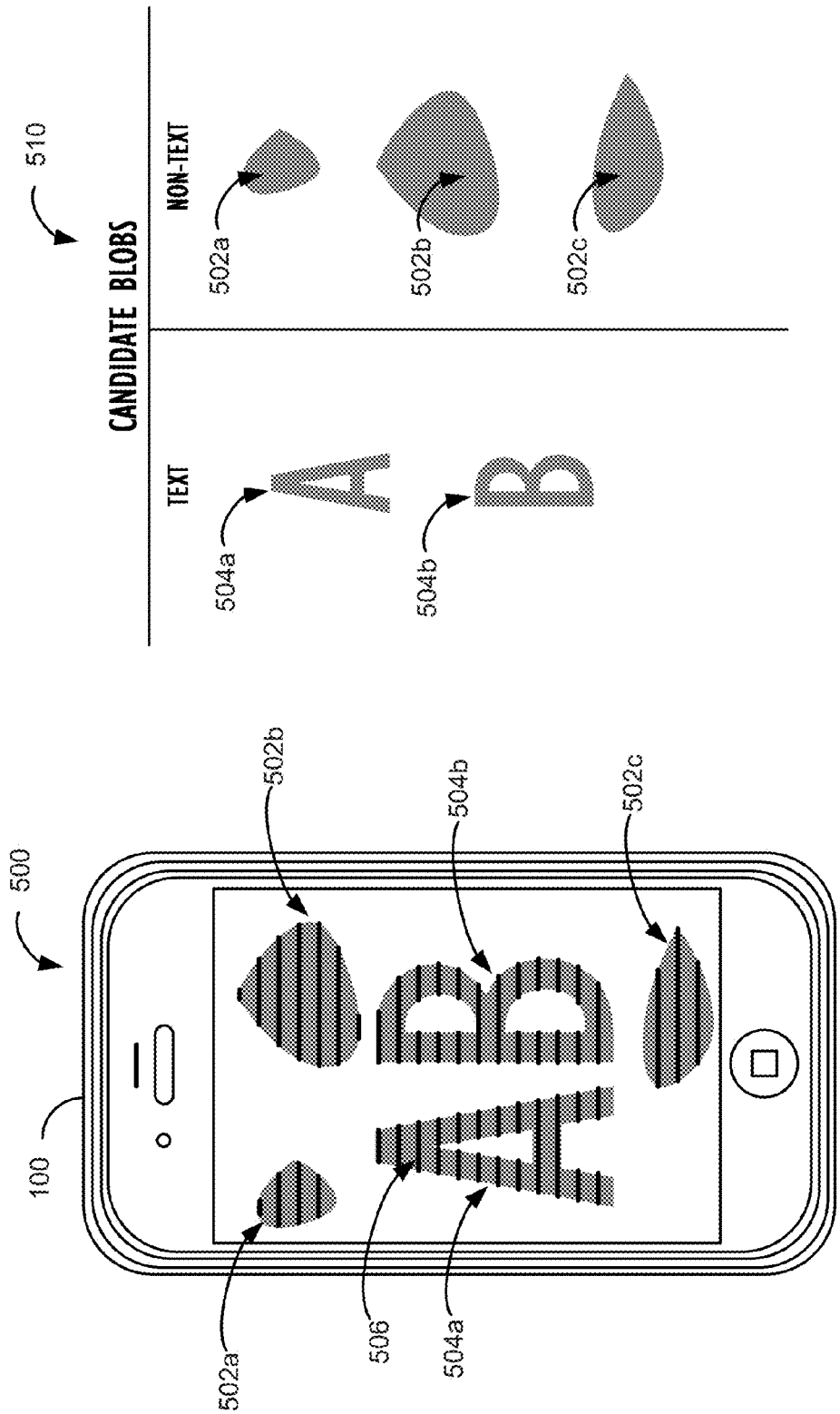
FIG. 5A illustrates image orientation determination based on optical character detection data, according to one embodiment.

Referring now to FIG. 5A, image orientation determination based on optical character detection data is shown, according to one embodiment. As shown in FIG. 5A, image capture device 500 has captured an image comprising several text features and several non-textual features. According to one embodiment described herein, a process for image orientation determination based on optical character detection data begins by attempting to locate and segment out all such features from the captured image. First, a particular scale filter must be chosen for the text scan. For example, it has been empirically determined that a 15 by 15 filter may effectively segment text in the 8 point to 12 point font range. In some embodiments, the text scan process may be run at many different scales so that any size of text can be located, and the scale that provides the largest percentage of text features will be selected as the text scan scale for character recognition. Next, for each position of the text scanning block as it moves over the image, the average brightness of pixels within the scanning block may be calculated. If the center pixel of the block is darker than the average brightness of the scanning block by some predetermined threshold, e.g., ten, then the pixel is considered to be part of a "feature" and is set to black. If the center pixel of the block is not darker than the average brightness of the scanning block by the predetermined threshold, then the pixel is not considered to be part of a "feature" and is set to white. In this way, a black and white image is produced comprising a set of black and white pixels, wherein black pixels represent areas likely to be part of an image feature. Connected components are then extracted from the black and white image and stored as an array of individual blobs. A blob is a collection of connected horizontal line segments 506. For example, each of the representative blobs 502*a*-502*c* and 504*a*-504*b* shown on the display of device 500 are depicted showing their connected horizontal line segments 506.

Once the blobs have been located and characterized, one embodiment of an image orientation determination process described herein may next assign each blob a potential of being "text." In one embodiment, histograms of geometric properties of the blobs learned from training images are used to determine a particular blob's "text potential." These properties may comprise various blob scoring metrics. In some embodiments, it will be beneficial to have one or more rotationally invariant scoring metrics, that is, scoring metrics whose ability to determine the "text potential" of a particular blob are independent of the orientation of the underlying text comprising the blob. Since these OCD techniques will be applied mostly in scenarios where no device orientation may be assumed, it may be important that the blob scoring metrics effectively identify text in any orientation.

Some illustrative blob scoring metrics are shown in Table 1 below:

TABLE 1

Illustrative Blob Scoring Metrics

Figure 5B:
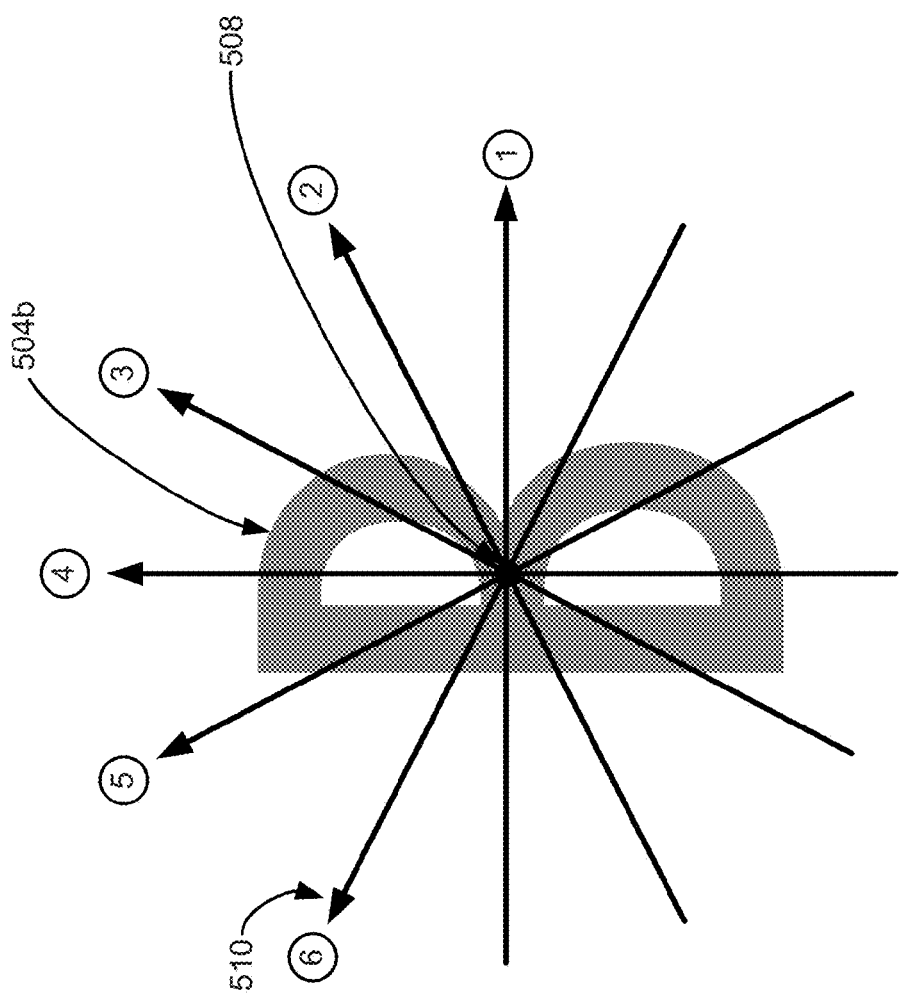
FIG. 5B illustrates various directional axes passing through the centroid of a text blob, according to one embodiment.

| | | |
|---|---|---|
| 1.) | Bitmap Area (BA) | Area of the blob |
| 2.) | Aspect Ratio | Width of the blob/Height of the blob |
| 3.) | Perimeter Sq Per Area | (Length of path circumscribing blob)$^2$/BA |
| 4.) | Mean and Standard Deviation along six axes through the centroid of the blob | See FIG. 5B (centroid 508, axes 510) |

Items (1)-(3) in Table 1 above may provide useful rotationally invariant dues as to the "text potential" of a given blob. Of course, other parameters may be used in addition to, or in place of, the parameters listed in Table 1 above.

Once the desired parameters have been selected and evaluated, a given blob's potential (i.e., likelihood) of being text may be determined using statistical methods, such as an adaptive boost-based algorithm (e.g., Adaboost) that uses a filter cascade to hone in on text regions. Alternately, a decision forest algorithm may be used to classify a blob into one of five classes directly (e.g., non-text, upright character, character rotated left, character rotated right, upside-down character), thus simultaneously determining the orientation of the blob, should it be determined to be a textual blob.

As is shown in FIG. 5A, blobs 502*a*, 502*b*, and 502*c* have been determined to be non-text, and blobs 504*a* and 504*b* have been determined to be text. Once the text blobs are identified, one embodiment of an image orientation detection process described herein may next determine whether the particular text is upright or not for a given assumed orientation. This determination may be made by using the twelve parameters labeled as item (4) in Table 1 above, i.e., the means and standard deviations computed with the coordinates of the pixels in the blob along each of the six axial directions passing through the centroid of the blob. As shown in FIG. 5B, various directional axes 510 labeled in circles 1-6 are shown passing directionally through the centroid 508 of an exemplary text blob 504*b*, in this case, the letter 'B.' The centroid 508 represents the calculated weight center of the identified feature, in this case blob 504*b*. The placement of the six axes at roughly evenly spaced angles around the blob that is being analyzed has been found to provide a sufficient characterization of the overall pixel distribution of the blob. For example, the 'B' character, represented by blob 504*b* in FIG.

5B, has the largest standard deviation in axial direction 4, and the smallest standard deviation in axial direction 1.

As mentioned above, some embodiments of OCD used herein may employ a "decision forest" or similar style of algorithm that learns (e.g., from the use of training samples) the weak classifiers needed to distinguish between the various classes of blobs. For example, using a decision forest algorithm, a blob comprising of the letter 'o' will likely end in a leaf node where all four orientations are equally probable (i.e., 'o' is not a good character from which to determine image orientation). The letters 'Z' or 'X,' on the other hand, will likely end in a leaf node that has two distinct peaks: upright character and upside-down character. Letters 'E,' 'Y,' or 'C,' for example, will likely have only one peak in the probability distribution, and thus prove to be more reliable indicators of image orientation.

The inventor has realized that only a few character determinations are needed to determine the orientation of an image, and that using the six exemplary axial directions shown in FIG. 5B is sufficient to determine the orientation of enough characters to be able to determine the orientation of an image satisfactorily for most implementations. For example, with the use of six axial directions, a decision forest tree may be 6 layers deep, thus resulting in $2^6$, or 64, different orientation tests. While each individual test may be a "weak classifier" (i.e., providing a correct orientation prediction in roughly 50% of cases), several weak classifiers combined together can make for a strong classifier of orientation. For example, in one embodiment, a first test in the tree may be to check if the standard deviation in axial direction 4 is larger than the standard deviation in axial direction 1. Such a test alone may be able to separate the upright character and upside-down character classes from the character rotated left and character rotated right classes for the majority of characters. Subsequent layers in the tree utilizing the metrics described above and in Table 1 may thus be able to distinguish between the blob classes for a majority of cases.

As will be understood, the use of more or different axes, or of additional blob scoring metrics, may also lead to an improved character detection (and thus image orientation determination) rate.

In one embodiment, each text blob may be analyzed for "uprightness" in each of the four possible device orientation directions, and a single most likely orientation direction may be recorded for the text blob based on determining the orientation direction in which the twelve parameters labeled as item (4) in Table 1 above are the most indicative of the presence of an upright character. After all the identified blobs in the image have been analyzed, the orientation direction having the largest number of upright text blobs may then be deemed to be the likely correct orientation for the overall image.

In another embodiment, and as mentioned above, such as by using a decision forest algorithm, the preliminary step of determining whether or not a blob is text before determining the orientation of the blob may no longer be necessary. This is because the decision forest can have a 'non-text' classification as one of its standard outputs (in addition to the four directional text classifications). Use of such an algorithm may provide for additional efficiencies in the orientation determination process.

Still other image processing techniques beyond optical character detection and face detection could be employed to aid in image orientation determination. For example, sky is usually intended to be along the top side of an image when properly oriented. Thus, using color tones and/or brightness values that are empirically determined to be indicative of "sky tones," the pixels in a given image may be analyzed to determine where the most likely "sky regions" of the image are, and the image's orientation may be determined to be that orientation which places the most "sky region" pixels along the top part, e.g., the top half, of the image. Other image processing techniques may also be employed if there is satisfactory confidence from empirical testing that a particular image feature or features are sufficiently indicative of a particular image orientation. For example, other objects that give good orientation information, e.g., trees, cars, or buildings, could likewise be detected. However, building detectors for objects with greater variability in shape and possible poses are harder to create, as would be expected.

Figure 6:
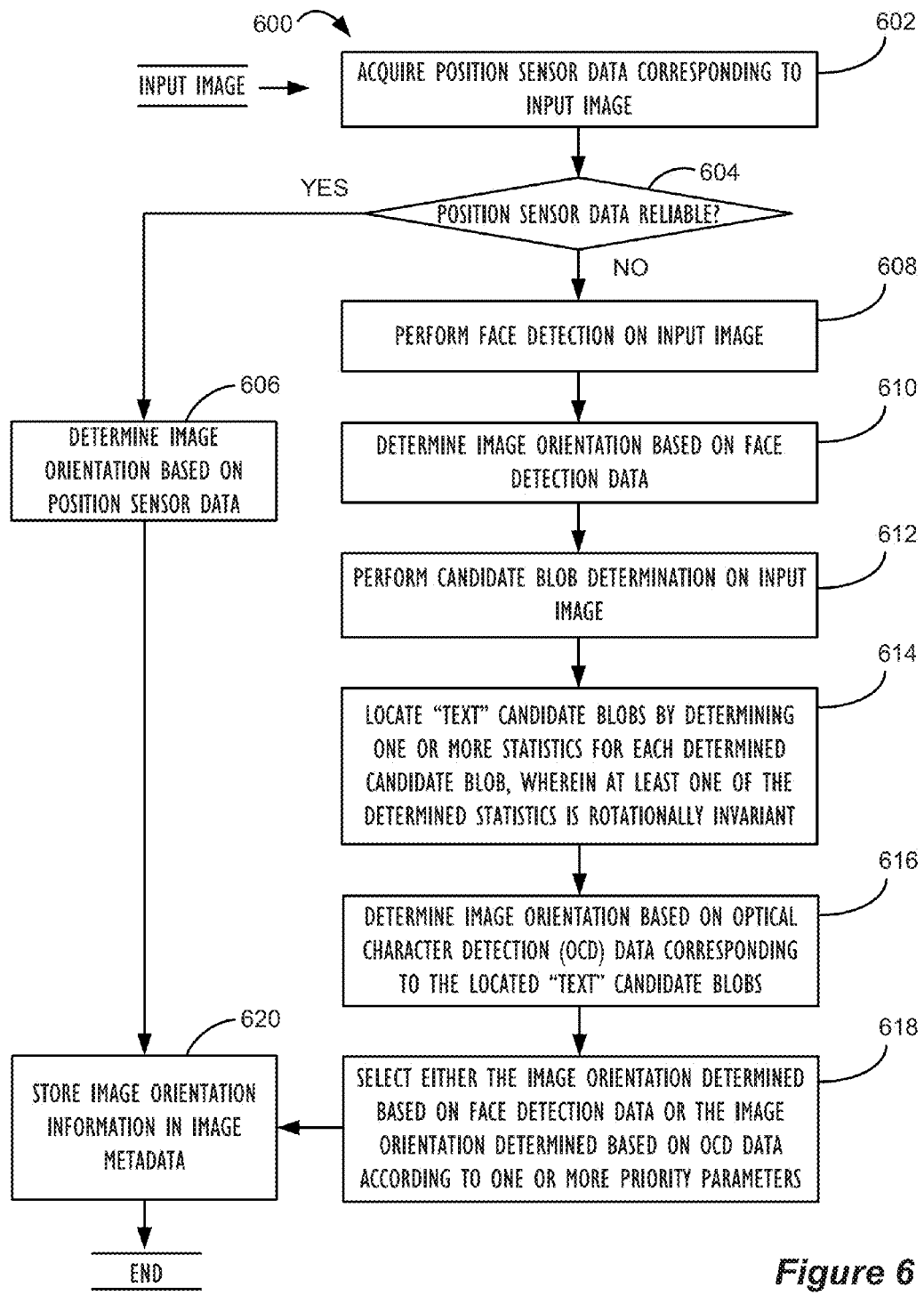
FIG. 6 illustrates a process for performing image orientation determination using image processing techniques, in accordance with one embodiment.

Referring now to FIG. 6, a process 600 for performing image orientation determination using image processing techniques is shown, in accordance with one embodiment. First the process begins by receiving an input image, e.g., from the image sensor or camera sensor array of an image capture device. Next, the image capture device acquires position sensor data, e.g., accelerometer data, corresponding to the input image (Step 602). Next the positional sensor data is analyzed to determine if it may be reliably used to determine the orientation of the device (Step 604). In some embodiments, this determination may comprise determining whether the axis of the device that is coaxial with the device's image sensor is within 15 degrees of the direction of the gravity vector. In such an embodiment, if the axis of the device that is coaxial with the device's camera sensor array is within 15 degrees of the direction of the gravity vector, then position sensor is deemed to be unreliable for determining the orientation of the device. Otherwise, the position sensor is deemed to be reliable enough to be used in determining the orientation of the device Thus, if at Step 604, the position sensor data is found to be reliable, the process may proceed to Step 606 to determine image orientation based on the position sensor data and then store the image orientation information in the image metadata (Step 620). If instead, at Step 604 the position sensor data is found to be unreliable, the process may proceed to Step 608 to perform face detection on the input image. Next, the process may determine image orientation based on the output of the face detection process, e.g., in a manner as described above in reference to FIG. 4 (Step 610).

Next, various image processing techniques may be used to perform candidate blob determination on input image (Step 612). Candidate blobs may be determined according to the description of the algorithm described above in reference to FIG. 5A, or in accordance with any other ell-known feature detection implementations. Next, the process may locate "text" candidate blobs by determining one or more statistics for each determined candidate blob, wherein at least one of the determined statistics is rotationally invariant (Step 614). Candidate blobs that have a high enough overall text score will be considered "text" blobs. Next, the process may determine image orientation based on OCD data corresponding to the located "text" candidate blobs (Step 616). Finally, the process may select either the image orientation direction that was determined based on the face detection data in Step 610 or the image orientation direction that was determined based on the OCD data in Step 616 (Step 618). This determination may be made according to one or more predetermined priority parameters. For example, the determination made by the image processing analysis technique having the higher priority parameter would be the orientation determination selected and stored in the image metadata in Step 620. As one illustration of the use of priority parameters, if the text data for a given image is very reliable (e.g., more than 50 characters of consistent orientation are found), then precedence may be given to the orientation determination made based on text detection, otherwise the face orientation determination may be used. If only one type of feature is present in an image (i.e., just face and no text, or just text and no face), then the feature that is present in the image may be used. On the other hand, if the two types of image processing analyses reach inconsistent results, another embodiment of an image orientation detection scheme may simply deem the image's true orientation to be inconclusive and not store any image orientation metadata with that particular image at Step 620. While FIG. 6 shows the face detection steps (Steps 608 and 610) as occurring before the text detection steps (Steps 612, 614, and 616), it is to be understood that this is merely exemplary, and that, in other embodiments and applications, the face detection steps and text detection steps could be occurring simultaneously in order for the process to run more efficiently. It is further to be understood that, while FIG. 6 shows the text detection (Step 614) and text orientation (Step 616) steps as being separate steps, other implementations, e.g., a decision forest algorithm, may be able to combine the determination of "textness" and "text orientation" into a single classification process (as described above).

Figure 1:
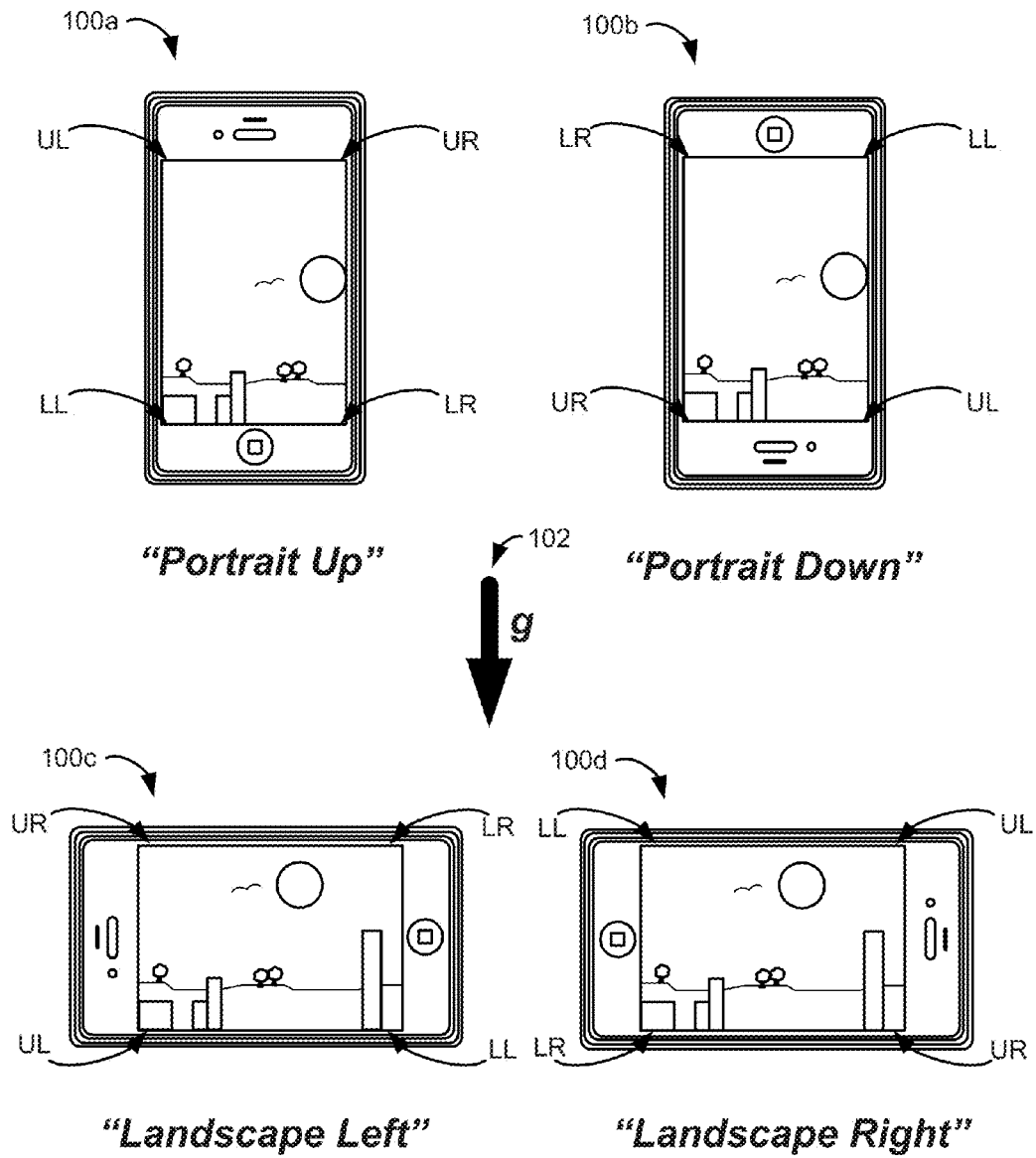
FIG. 1 illustrates various orientations of an electronic image capture device, in accordance with one embodiment.
Figure 2:
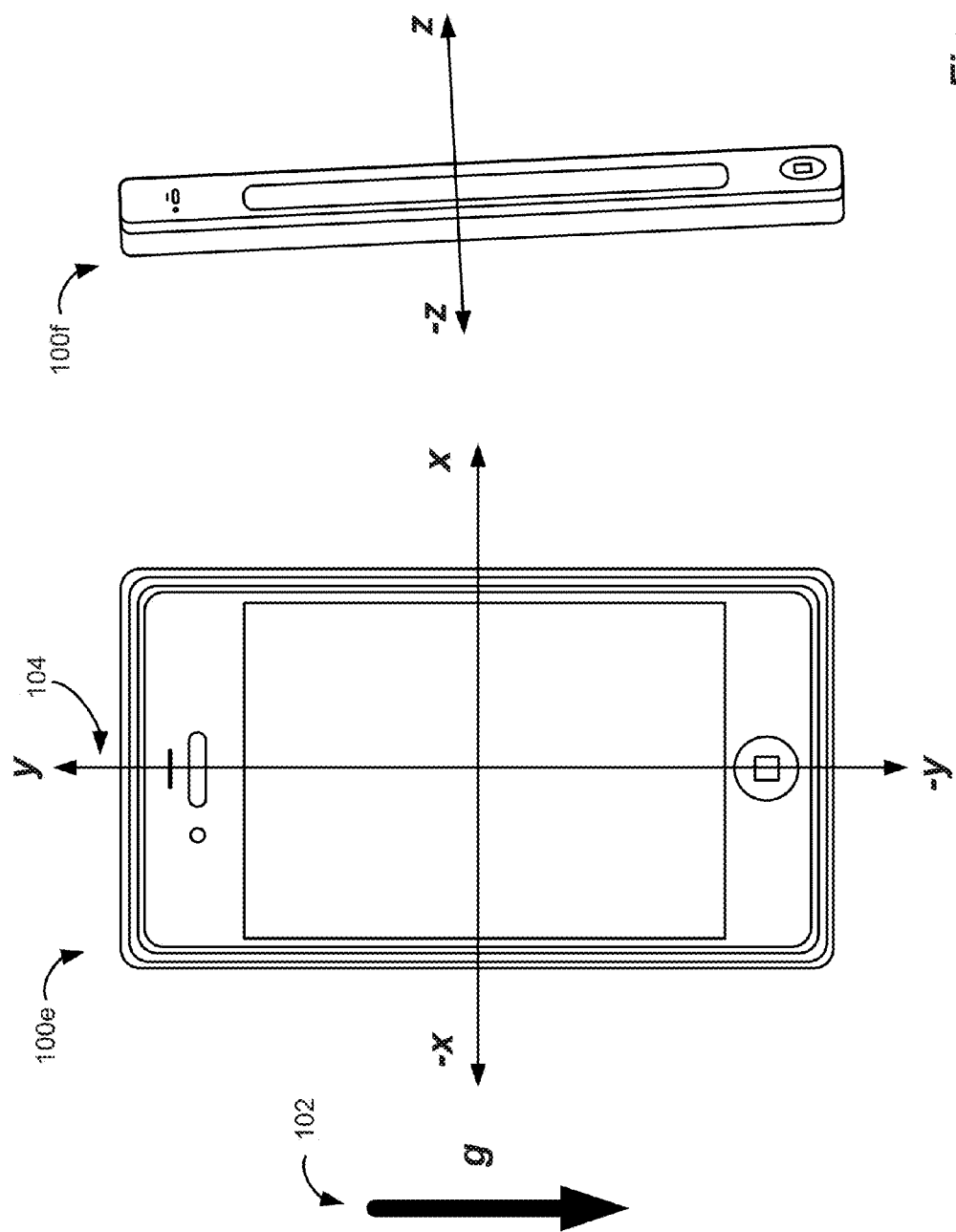
FIG. 2 illustrates the various axes of an electronic image capture device in relation to a gravity vector, in accordance with one embodiment.
Figure 3:
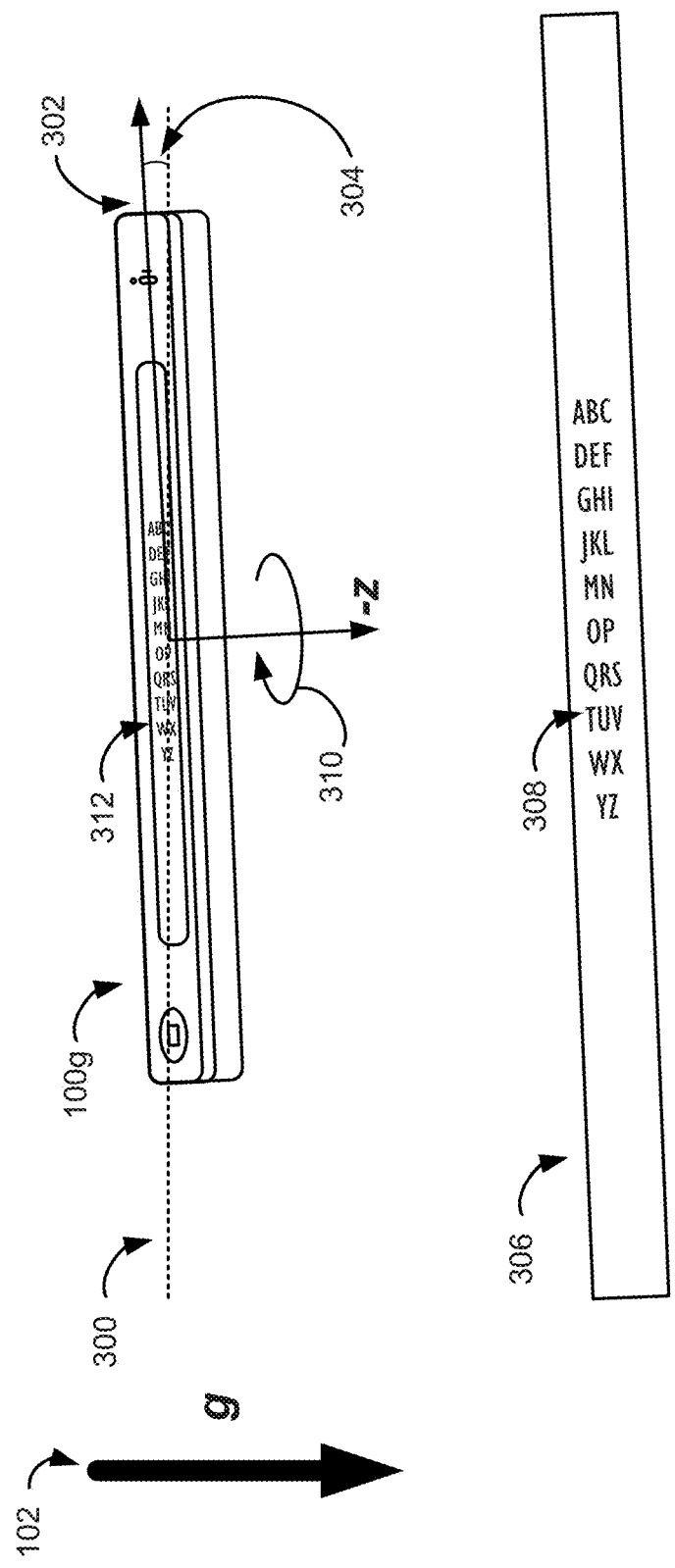
FIG. 3 illustrates an exemplary scenario wherein image orientation may not be reliably determined by the positional sensors of an electronic capture device, in accordance with one embodiment.
Figure 7:
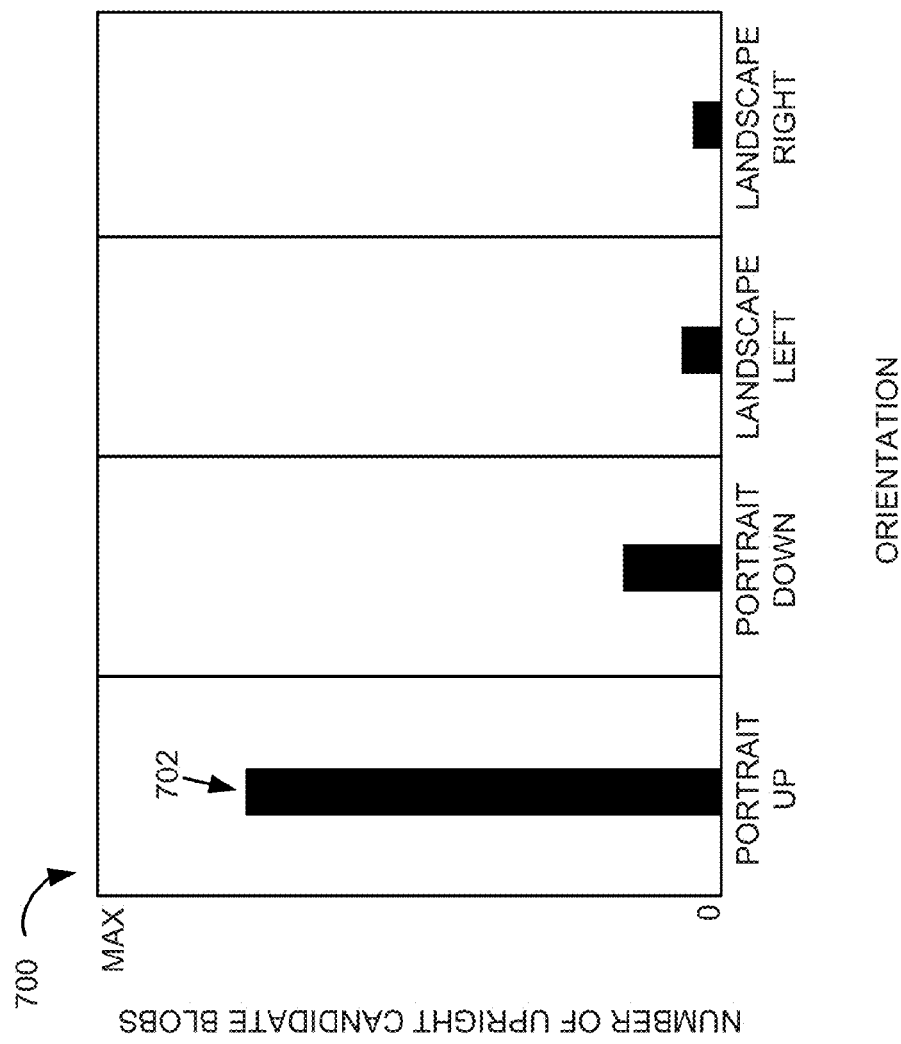
FIG. 7 illustrates a histogram for characterizing the most likely orientation of an image based on categorizing candidate text blobs, in accordance with one embodiment.

Referring now to FIG. 7, a histogram 700 for characterizing the most likely orientation of an image based on categorizing candidate text blobs is shown, in accordance with one embodiment. Histogram 700 is divided up into four sections, with one bar in each section. Each bar is indicative of one of the four absolute device orientation positions depicted in FIG. 1 (i.e., "Portrait Up," "Portrait Down," "Landscape Left," and "Landscape Right"), and is labeled as such. As each text blob is analyzed for the presence of text in each of the four device orientation positions, it will be placed into the histogram category corresponding to the orientation direction in which the most upright text was recognized in the blob. Once each text blob has been categorized, the category with the largest number of text blobs will be deemed the likely device orientation for the image being analyzed. In FIG. 7, the greatest number of text blobs appear to fall into the "Portrait Up" orientation category, thus, bar 702 is the largest bar in histogram 700, and "Portrait Up" would be deemed the likely device orientation for the image being analyzed. Additionally, a second heuristic may also be employed to the orientation determination process utilizing a histogram. Specifically, the histogram bin with the largest number of entries may be compared to the bin with the second largest number of entries. If the second-ranked bin has more than one half of the entries of the largest bin, then the result of the text detection may be considered inconclusive, and will not be used to determine image orientation. In the case of FIG. 7, it appears that the image would still be determined to be "Portrait Up," even when applying the exemplary second heuristic described above.

In some embodiments of the character detection algorithms described above, the text detector is trained to prefer having false-positives in the "not-text" category over having false-positives in any of the four "text-with-orientation" categories. This is because not all of the characters present in an image need to be detected to determine the image orientation—even detecting only a small fraction of the characters present in an image is usually sufficient to determine image orientation. Thus, even if some characters in an image are not recognized as being text blobs, it is not likely to harm the algorithm's overall performance. As an example, if the orientation detection could be restricted to only English text, then detecting the characters 'e' and 'E' alone would likely provide for adequate image orientation detection.

Figure 8:
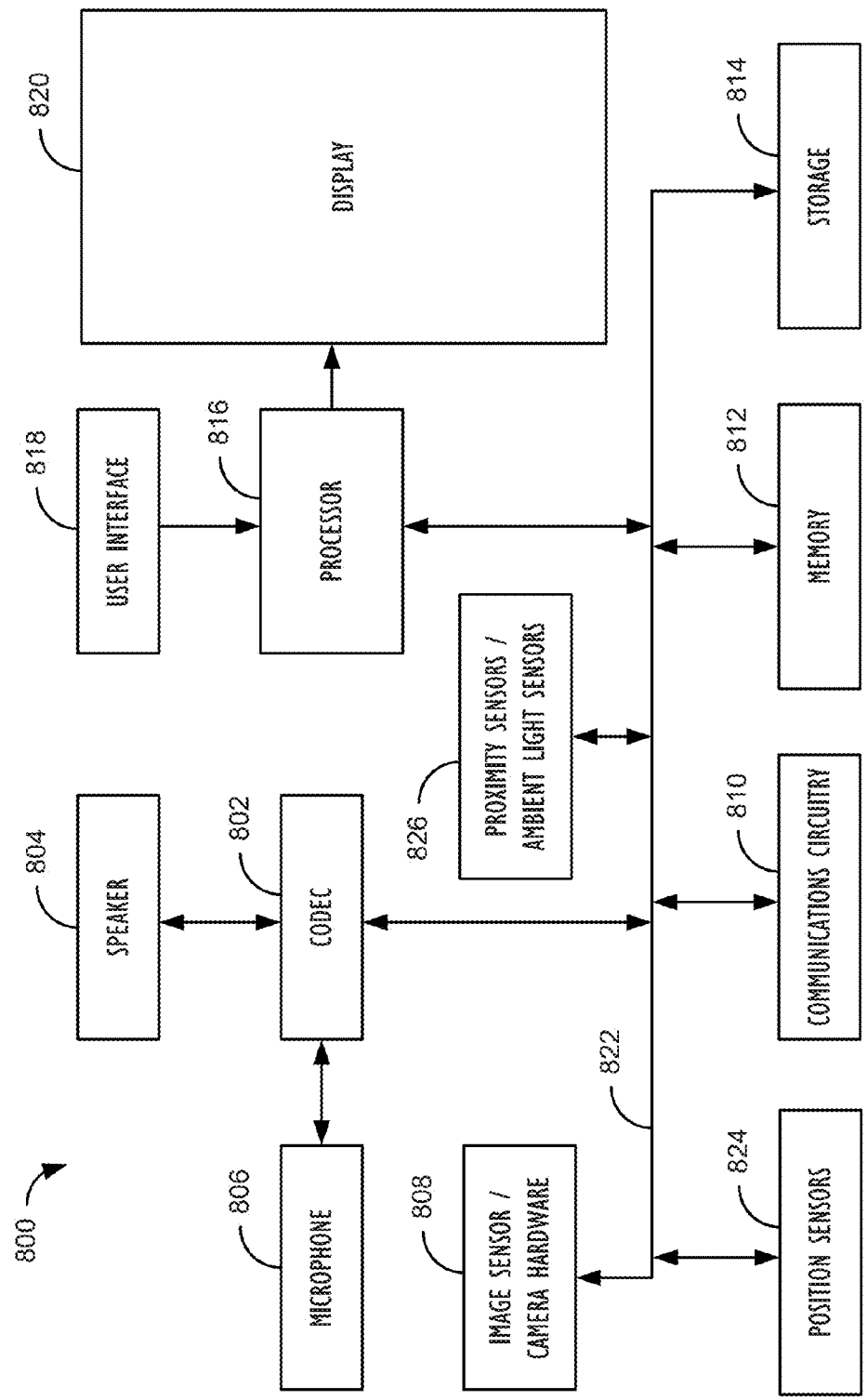
FIG. 8 illustrates a simplified functional block diagram of a representative electronic device possessing a display and positional sensors.

Referring now to FIG. 8, a simplified functional block diagram of a representative electronic device possessing a display 800 according to an illustrative embodiment, e.g., electronic image capture device 100, is shown. The electronic device 800 may include a processor 816, display 820, proximity sensor/ambient light sensor 826, microphone 806, audio/video codecs 802, speaker 804, communications circuitry 810, position sensors 824 (e.g., accelerometers or gyrometers), image sensor with associated camera hardware 808, user interface 818, memory 812, storage device 814, and communications bus 822. Processor 816 may be any suitable programmable control device and may control the operation of many functions, such as the generation and/or processing of image metadata, as well as other functions performed by electronic device 800. Processor 816 may drive display 820 and may receive user inputs from the user interface 818. An embedded processor provides a versatile and robust programmable control device that may be utilized for carrying out the disclosed techniques.

Storage device 814 may store media (e.g., image and video files), software (e.g., for implementing various functions on device 800), preference information, device profile information, and any other suitable data. Storage device 814 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++) and organized into one or more program modules.

Memory 812 may include one or more different types of memory which may be used for performing device functions. For example, memory 812 may include cache, ROM, and/or RAM. Communications bus 822 may provide a data transfer path for transferring data to, from, or between at least storage device 814, memory 812, and processor 816. User interface 818 may allow a user to interact with the electronic device 800. For example, the user input device 818 can take a variety of forms, such as a button, keypad, dial, a click wheel, or a touch screen.

In one embodiment, the personal electronic device 800 may be an electronic device capable of processing and displaying media such as image and video files. For example, the personal electronic device 800 may be a device such as such a mobile phone, personal data assistant (PDA), portable music player, monitor, television, laptop, desktop, and tablet computer, or other suitable personal device.

The foregoing description of preferred and other embodiments is not intended to limit or restrict the scope or applicability of the inventive concepts conceived of by the Applicant. As one example, although the present disclosure focused on handheld personal electronic image capture devices, it will be appreciated that the teachings of the present disclosure can be applied to other implementations, such as traditional digital cameras. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A non-transitory program storage device, readable by a programmable control device comprising instructions stored thereon for causing the programmable control device to:

obtain image data from a first image captured by an image sensor of a device;

detect text in the first image by analyzing the image data;

determine two or more statistics for the detected text, wherein at least two of the two or more determined statistics comprise a mean value and a standard deviation value along an axis passing through a centroid point of a character of the detected text, wherein the centroid point comprises a weight center of the character of the detected text;

determine an orientation of the first image based, at least in part, on the determined two or more statistics; and store the orientation of the first image as metadata with the first image.

2. The non-transitory program storage device of claim 1, wherein the instructions for causing the programmable control device to determine an orientation of the first image based on the determined two or more statistics comprise instructions for causing the programmable control device to apply one or more priority parameters.

3. The non-transitory program storage device of claim 1, wherein the instructions for causing the programmable control device to detect the text comprise instructions for causing the programmable control device to execute a text detection algorithm over the image data at multiple scales.

4. The non-transitory program storage device of claim 3, wherein the instructions for causing the programmable control device to detect the text further comprise instructions for causing the programmable control device to select the scale at which the largest amount of text is detected to be the scale used when determining the two or more statistics for the determined text.

5. The non-transitory program storage device of claim 1, wherein the instructions for causing the programmable control device to detect the text comprise instructions for causing the programmable control device to locate one or more features in the first image.

6. The non-transitory program storage device of claim 5, wherein the instructions for causing the programmable control device to detect the text further comprise instructions for causing the programmable control device to calculate one or more metrics for a located feature.

7. The non-transitory program storage device of claim 6, wherein the instructions for causing the programmable control device to calculate one of the one or more metrics comprise instructions for causing the programmable control device to analyze a plurality of axes passing through the feature.

8. The non-transitory program storage device of claim 7, wherein each of the plurality of axes passes through a centroid point of the feature.

9. The non-transitory program storage device of claim 7, wherein the instructions for causing the programmable control device to analyze a plurality of axes passing through the feature comprise instructions for causing the programmable control device to calculate a mean value along at least one of the plurality of axes.

10. The non-transitory program storage device of claim 7, wherein the instructions for causing the programmable control device to analyze a plurality of axes passing through the feature comprise instructions for causing the programmable control device to calculate a standard deviation value along at least one of the plurality of axes.

11. An electronic device, comprising:
memory;
an image sensor communicatively coupled to the memory;
a positional sensor;
a display communicatively coupled to the memory; and
a programmable control device communicatively coupled to the memory and the positional sensor, wherein the memory includes instructions for causing the programmable control device to:
obtain image data from a first image captured by the image sensor;
detect text in the first image by analyzing the image data;
determine two or more statistics for the detected text, wherein at least two of the two or more determined statistics comprise a mean value and a standard deviation value along an axis passing through a centroid point of a character of the detected text, wherein the centroid point comprises a weight center of the character of the detected text;
determine an orientation of the first image based, at least in part, on the determined two or more statistics; and
store the orientation of the first image as metadata with the first image in the memory.

12. The electronic device of claim 11, wherein the positional sensor comprises an accelerometer.

13. The electronic device of claim 12, further comprising instructions for causing the programmable control device to determine whether the first image was captured while the electronic device was in an unreliable position, wherein the unreliable position comprises a position wherein an orientation of the first image is not able to be determined based on output from the position sensor.

14. The electronic device of claim 13, wherein the instructions for causing the programmable control device to determine whether the first image was captured while the electronic device was in an unreliable position comprise instructions for causing the programmable control device to use data received from the accelerometer.

15. The electronic device of claim 14, wherein the instructions for causing the programmable control device to determine whether the first image was captured while the electronic device was in an unreliable position further comprise instructions for causing the programmable control device to determine an angular offset of the electronic device from a normal plane to a gravity vector.

16. The electronic device of claim 15, wherein the instructions for causing the programmable control device to determine whether the first image was captured while the device was in an unreliable position further comprise instructions for causing the programmable control device to determine the position to be unreliable if the angular offset of the device from the normal plane to the gravity vector is less than about fifteen degrees.

17. A non-transitory program storage device, readable by a programmable control device comprising instructions stored thereon for causing the programmable control device to:
obtain image data from a first image captured by an image sensor of a device;
detect text in the first image by analyzing the image data;
determine two or more statistics for the detected text, wherein at least two of the two or more determined statistics comprise a mean value and a standard deviation value along an axis passing through a centroid point of a character of the detected text, wherein the centroid point comprises a weight center of the character of the detected text;
determine an orientation of the first image based on the determined two or more statistics; and
store the orientation of the first image as metadata with the first image in a memory.

18. The non-transitory program storage device of claim 17, wherein the instructions for causing the programmable control device to determine an orientation of the first image based on the determined two or more statistics comprise instructions for causing the programmable control device to use of a decision forest.

19. The non-transitory program storage device of claim 17, wherein the instructions for causing the programmable control device to detect the text comprise instructions for causing the programmable control device to locate one or more features in the first image.

20. The non-transitory program storage device of claim 19, wherein the instructions for causing the programmable control device to detect the text further comprise instructions for causing the programmable control device to calculate one or more metrics for a located feature.

21. The non-transitory program storage device of claim 20, wherein the instructions for causing the programmable control device to calculate one of the one or more metrics comprise instructions for causing the programmable control device to analyze a plurality of axes passing through the located feature.

22. The non-transitory program storage device of claim 21, wherein the instructions for causing the programmable control device to analyze a plurality of axes passing through the located feature comprise instructions for causing the programmable control device to calculate a mean value along at least one of the plurality of axes.

23. The non-transitory program storage device of claim 21, wherein the instructions for causing the programmable control device to analyze a plurality of axes passing through the located feature comprise instructions for causing the programmable control device to calculate a standard deviation value along at least one of the plurality of axes.

24. An electronic device, comprising:
memory;
an image sensor communicatively coupled to the memory;
a positional sensor;
a display communicatively coupled to the memory; and
a programmable control device communicatively coupled to the memory and the positional sensor, wherein the memory includes instructions for causing the programmable control device to:
obtain image data from a first image captured by the image sensor, the first image stored in the memory;
determine whether the first image was captured while the electronic device was in an unreliable position based, at least in part, on output from the positional sensor, wherein the unreliable position comprises a position wherein an orientation of the first image is not able to be determined based on output from the position sensor; and
when it is determined that the first image was captured while the electronic device was in an unreliable position, execute instructions stored in the memory for causing the programmable control device to:
detect text in the first image by analyzing the image data;
determine two or more statistics for the detected text, wherein at least two of the two or more determined statistics comprise a mean value and a standard deviation value along an axis passing through a centroid point of a character of the detected text, wherein the centroid point comprises a weight center of the character of the detected text;
determine an orientation of the first image based, at least in part, on the determined two or more statistics; and
store the orientation of the first image as metadata with the first image in the memory.

* * * * *

UNITED STATES PATENT AND TRADEMARK OFFICE
CERTIFICATE OF CORRECTION

PATENT NO.         : 8,643,741 B2                                          Page 1 of 1
APPLICATION NO.    : 13/351804
DATED              : February 4, 2014
INVENTOR(S)        : Ralph Brunner It is certified that error appears in the above-identified patent and that said Letters Patent is hereby corrected as shown below:

In the Claims

Column 14, Claim 13, line 27, replace "position sensor" with --positional sensor--.

Column 16, Claim 24, line 17, replace "position sensor" with --positional sensor--.

Signed and Sealed this
Twenty-ninth Day of April, 2014

Michelle K. Lee
*Deputy Director of the United States Patent and Trademark Office*